Oct. 3, 1933. P. PASCHEN ET AL 1,929,367
RECORDING MEASURING INSTRUMENTS
Original Filed May 19, 1930 5 Sheets-Sheet 5

Patented Oct. 3, 1933

1,929,367

UNITED STATES PATENT OFFICE 1,929,367

RECORDING MEASURING INSTRUMENTS

Paul Paschen and Georg Mohr, Nuremberg, Germany, assignors to Siemens-Schuckertwerke Aktiengesellschaft, Berlin-Siemensstadt, Germany, a corporation of Germany Original application May 19, 1930, Serial No. 453,561, and in Germany May 23, 1929. Divided and this application March 24, 1931. Serial No. 524,918

4 Claims. (Cl. 234—35)

Our invention relates to improvements in recording measuring instruments and more particularly in electricity meters in combination with a printing device which, in operating prints the reading of the counter, or immediately a receipt.

The object of our invention is to provide a measuring instrument in which the end position of the counter is printed on a paper chart, whereupon the counter is reset to the zero position and the zero position printed in order to check whether the counter has been completely reset into the zero position.

The invention will now be explained with reference to the example shown in the drawings in which Fig. 1 represents a front view of the paper chart and the printing mechanism;

The printing device proper will be described first.

Figure 1:
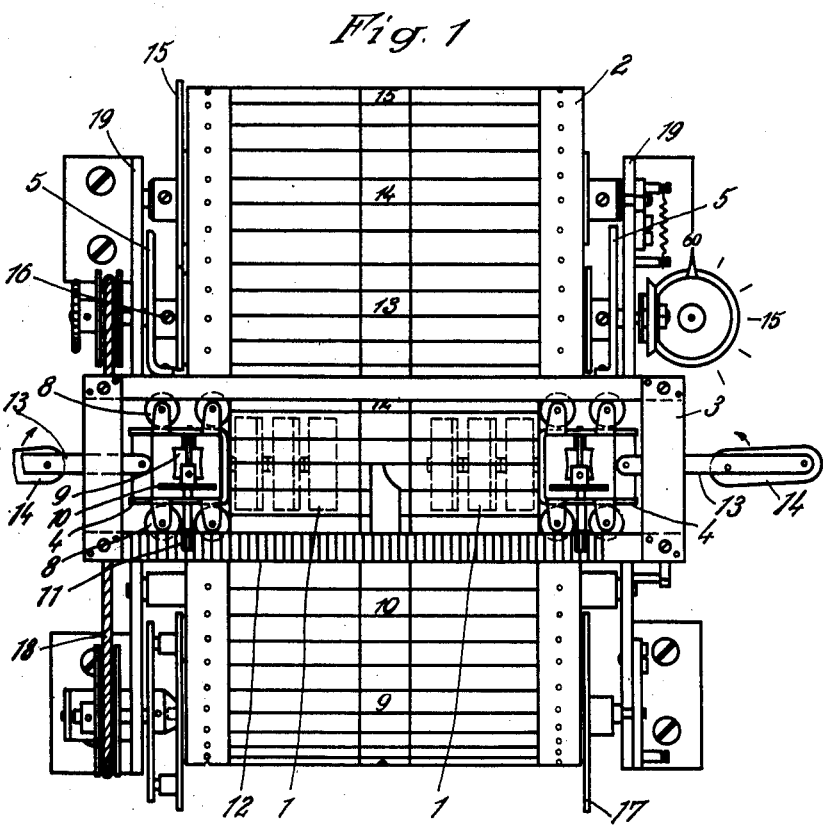

Two sets of counters 1 are provided, as shown in dotted lines in Fig. 1. They are numbered individually 231 and 241 in Fig. 4. The figures on the counter drums are raised and serve as types. The continuous paper chart 2 with the prepared writing surface passes over these numbers. In front of the paper chart is arranged the guiding frame 3 for the two carriages 4, one for each counter. The guiding frame is fastened to the arms 5, which can swing on the axle 6, (Fig. 2) the frame being pressed toward the writing surface by the spring 7.

In each carriage 4, which runs on the rollers 8 in the ways of the guiding frame 3, is journalled a friction printing roller 9, with its axis of rotation at right angles to the rotation axis of the counters. The circumferential surface of each roller conforms with the peripheral contour of the drums of its pertaining counter. Each friction roller 9 is driven by a step-up gear train, including the spur gear 10 and the pinion 11, which latter meshes with a rack 12 fixed along the ways of the guide frame 3. Each carriage 4 is connected by a connecting rod 13, Figures 1 and 4, to a crank 14, which rotates during the act of printing.

When the crank 14 rotates, its carriage 4 reciprocates in frame 3. The friction roller 9 rubs during this movement against the row of figures of the counter wheels, which lie at that time underneath the paper, and which are to be printed, the friction roller being at the same time driven at a peripheral speed, higher than the carriage speed, and in a direction contrary to that of the carriage. The friction rollers 9 which are made of silver or of any other metal or of an alloy, adapted to color white surfaces by abrasion, blacken the paper chart at the places where the counter figures bear against the paper from underneath. As practice shows, extremely little of the friction rollers is worn off thereby in the course of time.

A particular advantage with the above form of construction is that the carriages 4, in the shown position of rest of the printing device, leave the front of the printing surface normally free so that the printed figures may be easily read. This is obtained by disposing the one dead center of the crank mechanism 13, 14, far enough outward, so that in this position each carriage is withdrawn beyond its counter 1. During the act of printing, the friction rollers are pressed by the spring 7, through the guiding frame 3, gently against the surface of the paper. It is of advantage to groove the surface of the friction body in a direction slanting with respect to the direction of rotation or to roughen it in another manner. The guiding frame 3 may, after the spring 7 and the crank connection 13, 14 have been loosened, be turned upward round the axle 6, which renders the paper reel accessible for exchange.

The paper runs off the braked paper reel 15, and is driven continuously by a clock work 72 in known manner through a shaft 16ᵃ by means of a pin drum 16, and is reeled, after printing, onto the drum 17. This drum is driven from the same clock work by the rope drive 18 acting at the same time as a slip clutch, the ratio of transmission being such as tending to produce an increase in speed of reel 17. The paper consequently always remains stretched taut. The following is, with reference to the diagrammatic illustration of the mechanism in Figure 4, an explanation of the system of the transmission gears and of the mode of operation of the printing device. In the diagram and in the other figures the same reference characters are used for similar parts.

Figure 4:
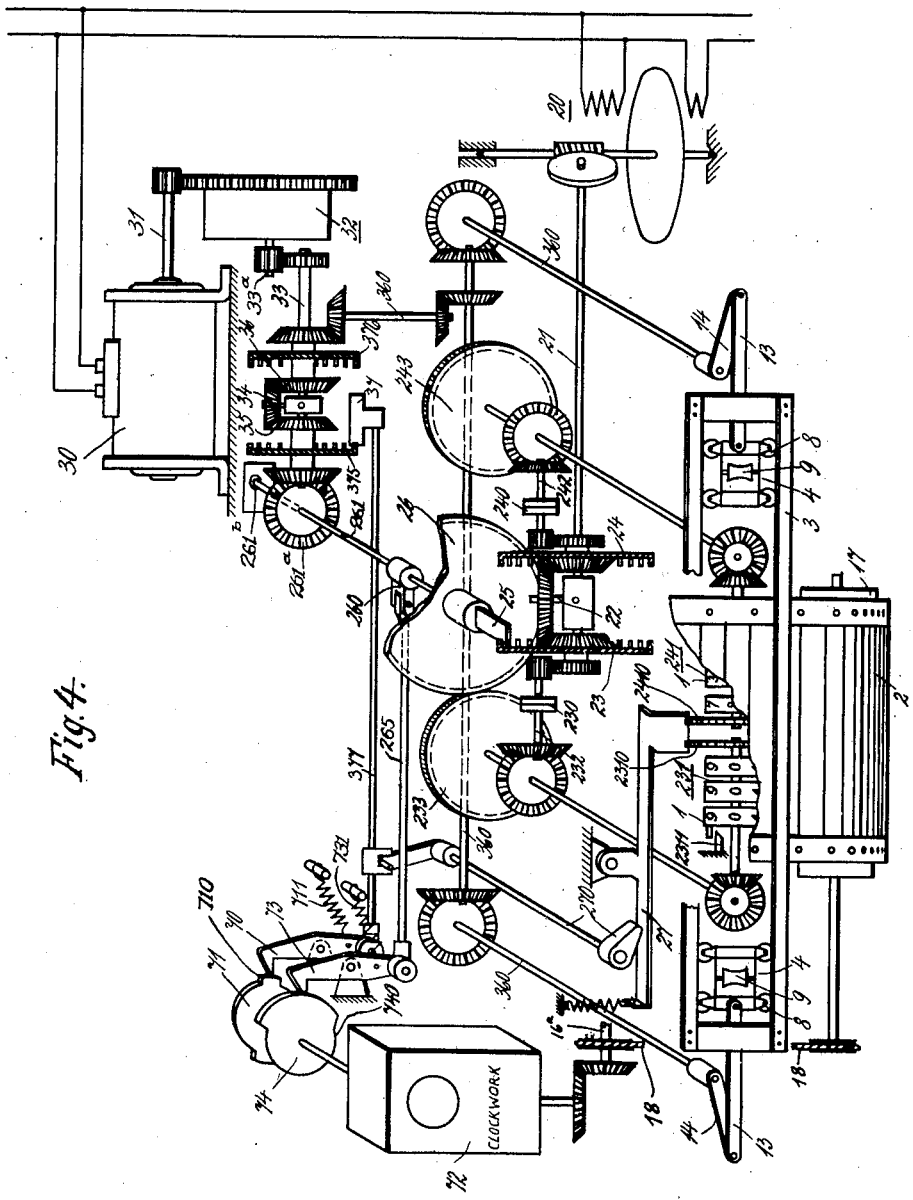
Fig. 4 represents a perspective view of the layout of the entire apparatus, some of the paper drive mechanism being broken away.

The electricity meter 20 rotates through the power transmission 21 the transverse planetary pinion stud 22 of a differential gear, the sun wheel 23 of which is being coupled, through the slip clutch 230, to the counting mechanism 231, and the sun wheel 24 of the differential gear being coupled through the slip clutch 240 to the counting mechanism 241. The sun wheels 23, 24 can be alternately stopped by the locking member 25 so that only one of the counting mechanisms can be driven at a time by the meter 20. To the halves of the slip clutches 230, 240 which connect with the respective counters are coupled the reversing wheels 233, 243 which can be meshed at will with the reversing gear 26. The coupling with this gear is effected by means of the coupling joint 260 which, as shown in Fig. 4, also actuates the locking member 25 previously mentioned. The reversing gear 26 of the resetting-to-zero mechanism, which may be meshed with either gear 233 or gear 243, is geared through shaft 261 to one sun wheel 35 of a differential gear, whose transverse or planetary wheel 34 is driven through the power shaft 33 from the power storage mechanism 32. This mechanism consists of a spring (not shown) to whose arbor 33ª shaft is geared, and of the spring housing, all arranged the same as in any ordinary clock work. This power storage mechanism 32 is, through the power transmission 31, wound up periodically, or rewound each time, by the amount it has run down, by the action of control mechanism well known in the art, and not shown here, by a small motor 30. This power storage mechanism has a reserve of power sufficient to operate the printing device several times even if there is no current for the motor 30, for instance, if the pressure supply fails.

As will be seen from Fig. 4, the other sun wheel 36 of the last mentioned differential gear is geared through the power transmission 360 to the crank drives for carriages 4, which latter carry the printing rollers 9. The movement of the sun wheels 35, 36 may be alternately stopped by the locking member 37, which is disposed to engage either pin wheel 375 or 376, fixed to sun wheels 35, 36 respectively.

With the counting mechanisms are connected notched disks 2310 and 2410 which are set in such a manner by the operation of the adjusting device 27 each time before printing takes place that the last decimal of the counter is a whole number. The adjusting device 27 is coupled through the cam operating mechanism 270, to the operating mechanism of locking member 37. Both parts are controlled, through the control lever 70 and the cam 71, from the clockwork 72, which also controls the aforementioned coupling joint 260 for gear 26 and for stop 25 through the control lever 73 and cam 74. The device operates as follows:

In the position shown in Fig. 4, the meter 20 drives the right hand counter 241, the counter 231 having before that been turned back by the reversing mechanism 26 until it reaches the zero position at the stop 2311. After a certain time, the high portion 710 of cam disk 71 engages pawl 70 which latter is forced then to rock clockwise against the tension of its spring 711. Push rod 377 and stop 37 are thereby moved to the left and pin wheel 375 is arrested. Through rod 377 cam operating mechanism 270 is at the same time operated counterclockwise and releases counter adjusting device 27 to rock in clockwise direction, so that the counter 241 is thereby set to a whole number and held there. The spring power mechanism 32 now drives the printing device 4, 9 through the parts 33, 34, 36, 360. At the counter 231 is printed the zero position and at the counter 241 the metered value in the manner described. The carriages 4 perform a reciprocating movement, until finally the controlling pawl 70 leaves high cam surface 710 and rocks counter clockwise. This moves stop 37 to the right, whereby pin wheel 375 and sun wheel 35 are freed and pin wheel 376 with its sun wheel 36 is locked, thereby stopping the printing operation. At the same time, adjusting lever 27 is rocked counter clockwise and releases the notched disks 2310, 2410, which it had arrested during the printing operation for the exact setting of the type wheels. Also, at the same time, or shortly afterward, the low portion 740 of cam disk 74 meets the control pawl 73, which latter then rocks counter clockwise and thus shifts push rod 265 to the right, by which motion through joint 260 the reverse gear 26 is thrown in mesh with gear 243, and by locking finger 25 sun wheel 24 is locked. Shaft 261 can perform this swinging motion by journalling it slightly loosely in its rear bearing 261ᵇ, so that its front end can swing through a small arc without binding in the rear bearing. Its swing from the position in which its gear 26 engages gear 233 to the position in which gear 26 engages gear 243 is grossly exaggerated in Fig. 4. In reality the arc through which the free end of shaft 261 moves is only slightly longer than the height of the teeth of gear wheel 26, so that by this slight motion of shaft 261 the meshing of bevel wheel 261ª, which is located close to the rear bearing 261ᵇ, is not noticeably disturbed. The foregoing arrangement is a well known expedient, frequently employed in two-rate counters. Of course, in reality also finger 25 in Fig. 4 must be assumed to be sufficiently wide to bridge the gap between sun wheels 23 and 24, so that by the only slight swinging motion of shaft 261 either one or the other of these wheels can be locked.

The meter 20 is now by the aforedescribed function changed over from driving counter 241 to driving counter 231, and inversely the reversing mechanism 26 is changed over from the counter 231 to the counter 241 and turns the latter back until it reaches the zero position at a stop, not shown but similar to stop 2311.

Clutches 230 and 240 are so-called one-way clutches, allowing the transmission of power respectively from 23 to 231, and from 24 to 241, but not from 233 to 23 and from 243 to 24 respectively. Thus, during the resetting of counter 241 to zero, last described, the clutch 240 slips when sun wheel 24 is locked by the lock 25. Now, a new recording period begins, during which the current consumption metered at 20 is accumulated on the counter 231, whilst the counter 241 remains in the zero position. At the end of the counting period the printing device is again released. Now, the end position of the counter 231 and the zero position of the counter 241 is printed, when the carriages 4 wipe their printing rollers 9 over the paper, covering their pertaining counters. The zero position is printed in order to be able to check whether the individual counters have really been reset to zero. This control is important, because if the counters are not reset quite back to zero, the amount recorded, which is charged to the consumer, would be increased by the difference. The consumer would therefore be overcharged. If for some reason or other the zero position has not been reached, the difference is printed and can easily be deducted from the recorded amount for the following period.

It would also be possible to replace the change-over device constituting the elements 26, 233, 243 by a differential gear with a locking member. The device shown is, however, more advantageous, because the load on the meter 20 is thus lighter, since wheels 233 and 243 can, when out of mesh, move freely, and are not—as would be necessary when a differential gear is used—connected to the locked part of the differential gear by means of a slip clutch, which always has the effect of a brake.

Figure 2:
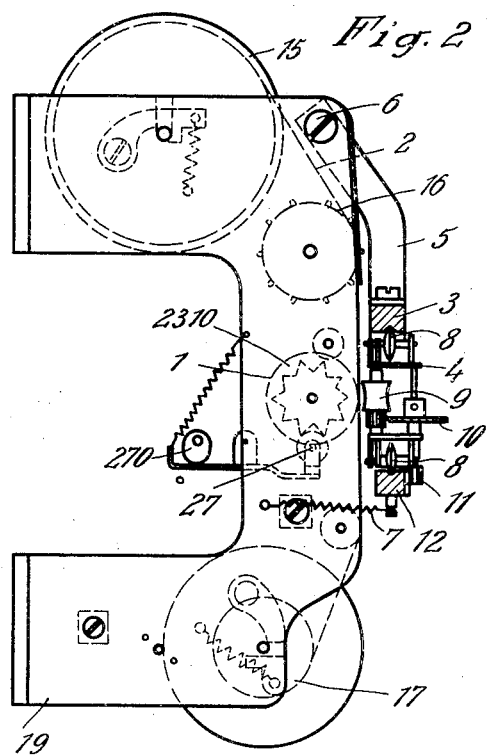
Fig. 2 represents a side elevation thereof.
Figure 3:
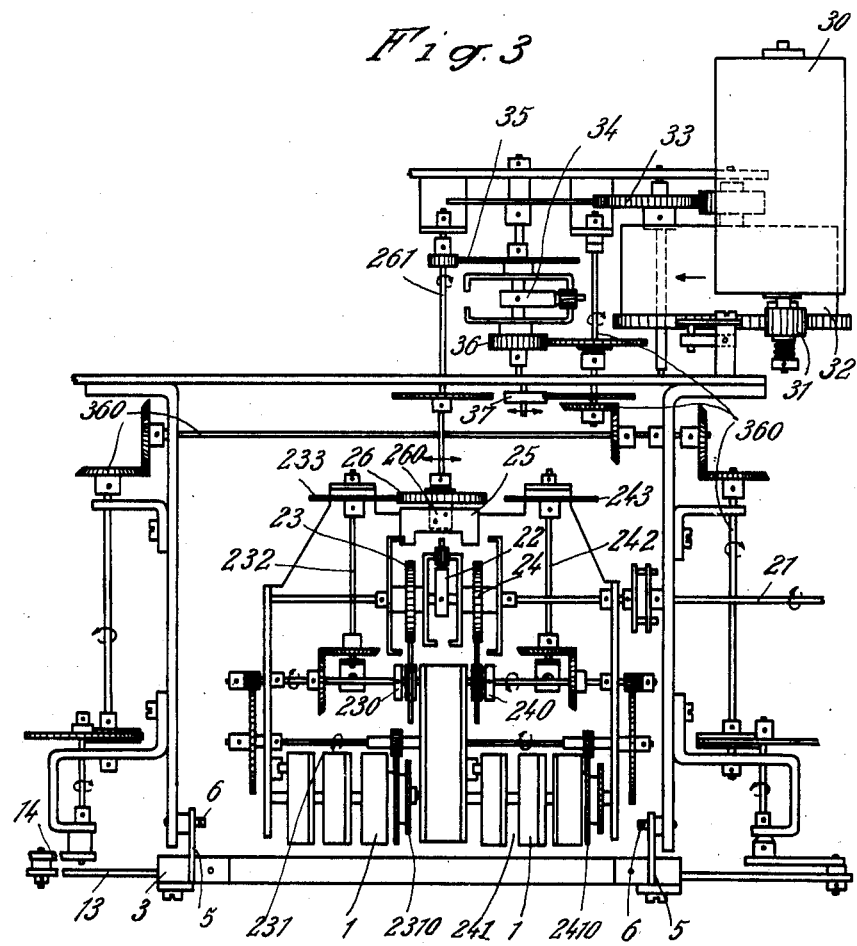
Fig. 3 represents a plan view of the apparatus, in more or less diagrammatic form.

In the example, compare particularly Figures 1 and 2, the whole printing device is mounted on a separate bridge-like frame 19, which may easily be placed over the supporting frame carrying the counter mechanism, as shown in Figure 3. This arrangement is of eminent importance for the mass production of the apparatus and for its operation, because both mechanisms may be individually assembled, exchanged and inspected. It is advisable to provide a paper reel 2 large enough for a whole year or at least a part of the year with consecutive numbers or other ordinal characters of one or more colors, in order to be able to determine, after the chart is printed, the time at which each individual record has been taken.

Figure 5:
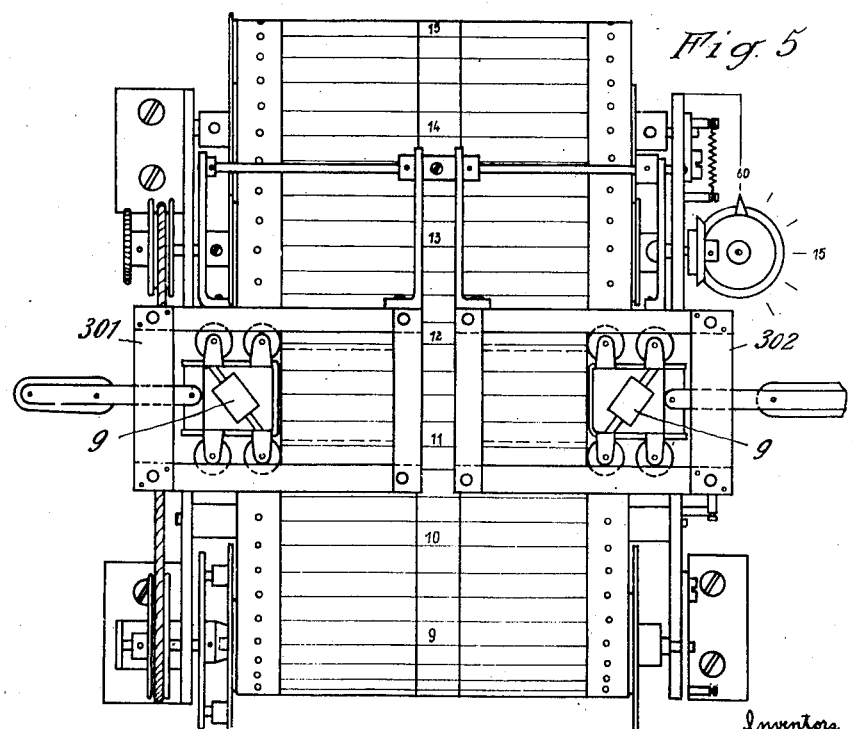
Fig. 5 represents a modification of the form of the printing frame, in the same view as the modification Fig. 1.

In Figure 5, the guiding frame for the carriages has been divided into two halves 301 and 302 as a modification. The gear drives 10, 11, shown in Figs. 1 and 2, for the friction printing rollers 9 have been omitted, and instead the axes of the printing rollers 9 are placed in a slanting position to the direction of the carriage movement, and the rollers move freely in their bearings. They are here driven by the movement of the carriage. It will be seen that during such movement the friction rollers perform a combined sliding and rolling movement over the printing surface, the sliding movement being sufficient to wipe enough roller material onto the printing surface to make a legible imprint.

We claim as our invention:

1. In a recording device for metered values, a metering device, a printing device comprising two counters having type-carrying wheels, a paper chart, means for printing on the paper chart the figures of the counter wheels of both counters in line with the paper, a device for connecting the counters alternately with the metering device to be driven thereby, a device for resetting to zero the counter disconnected from the metering device at the time, and means for setting the printing device into operation before the drive connection from one counter to the other is changed over.

2. In a recording device for metered values, a metering device, a printing device, including a counter having type wheels and means for printing the type wheel characters presented on a given printing line, means for resetting said counter to zero, a power drive, a differential gear having its planetary wheel connected to said power drive, and one of its sun wheels geared to said printing means and the second sun wheel geared to said resetting means, means for connecting said counter alternately with said metering device and with the second sun wheel of said differential gear, whereby the metering device advances the counter wheels and said second sun wheel returns them to zero position, said connecting means comprising two alternately operating locking devices, a first locking device for arresting the first sun wheel of the said differential gear after the printing is completed and a second locking device for arresting the second sun wheel of the differential gear after the counter has been reset to the zero position, and means for controlling said locking devices.

3. In a recording device for metered values, a metering device, a printing device, comprising two counters having type wheels and being disposed at the paper chart to be printed upon, means for printing the characters of said type wheels presented on a given printing line on said chart, a first differential gear having its planetary wheel driven by the metering device, and its first sun wheel geared to one of said counters and its second sun wheel geared to the other counter, a first locking device adapted to alternately arrest one of said sun wheels so that only the counter of the unlocked sun wheel is operable by said metering device, a second differential gear and a power drive connected to said gear to drive its planetary wheel, gearing between the first sun wheel of said second gear and said printing means, a zero return device driven by the second sun wheel of said second gear, and means for coupling said return device with either of said counters for alternately returning said counters to zero position, a second locking device for said second differential gear for alternately arresting its sun wheels to alternately permit the driving of said printing means and said zero return device by said power drive, and means for moving said chart past said counters and for alternately operating said two locking devices.

4. In a recording device for metered values, a metering device, a printing device, comprising two counters having type wheels and being disposed at the paper chart to be printed upon, means for printing the characters of the type wheels presented on a given printing line on said chart, a first differential gear having its planetary wheel driven by the metering device, and its first sun wheel geared to one of said counters and its second sun wheel geared to the other counter, slip clutches interposed between said two sun wheels and their pertaining counter driving gear, a first locking device adapted to alternately arrest one of said sun wheels so that only the counter of the unlocked sun wheel is operable by said metering device, a second differential gear and a power drive connected to said gear to drive its planetary wheel, gearing between the first sun wheel of said second gear and said printing means, a zero return device driven by the second sun wheel of said second gear and means for coupling said return device with either of said counters for alternately returning said counters to zero position, a second locking device for said second differential gear for alternately arresting its sun wheels to alternately permit the driving of said printing means and said zero return device by said power drive, and means for moving said chart past said counters and for alternately operating said two locking devices.

PAUL PASCHEN.
GEORG MOHR.